(12) United States Patent
Kim et al.

(10) Patent No.: US 12,341,902 B2
(45) Date of Patent: Jun. 24, 2025

(54) ENCRYPTION DEVICE AND AUTHENTICATION METHOD AND SIGNATURE GENERATING METHOD OF SYSTEM INCLUDING THE SAME

(71) Applicant: SAMSUNG ELECTRONICS CO., LTD., Suwon-si (KR)

(72) Inventors: Sungkyoung Kim, Hwaseong-si (KR); Jongtae Baek, Hwaseong-si (KR); Hunhee Lee, Suwon-si (KR); Jeehyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 404 days.

(21) Appl. No.: 17/721,903

(22) Filed: Apr. 15, 2022

(65) Prior Publication Data
US 2022/0337425 A1 Oct. 20, 2022

(30) Foreign Application Priority Data

Apr. 16, 2021 (KR) .......................... 10-2021-0050089
Jan. 3, 2022 (KR) .......................... 10-2022-0000377

(51) Int. Cl.
*H04L 9/00* (2022.01)
*H04L 9/08* (2006.01)
(Continued)

(52) U.S. Cl.
CPC .......... *H04L 9/3247* (2013.01); *H04L 9/0825* (2013.01); *H04L 9/083* (2013.01); *H04L 9/0869* (2013.01); *H04L 9/3006* (2013.01)

(58) Field of Classification Search
CPC ..... H04L 9/3247; H04L 9/0825; H04L 9/083; H04L 9/0869; H04L 9/3006;
(Continued)

(56) References Cited

U.S. PATENT DOCUMENTS 8,139,763 B2   3/2012   Boscher et al.
8,621,239 B2  12/2013   Lambert
(Continued)

FOREIGN PATENT DOCUMENTS

CN   109936455 A   6/2019
CN   111178894 A   5/2020
(Continued)

OTHER PUBLICATIONS

Nikodem, Maciej. "DSA signature scheme immune to the fault cryptanalysis." International Conference on Smart Card Research and Advanced Applications. Berlin, Heidelberg: Springer Berlin Heidelberg, 2008. (Year: 2008).*
(Continued)

*Primary Examiner* — Syed M Ahsan
(74) *Attorney, Agent, or Firm* — Sughrue Mion, PLLC

(57) ABSTRACT

The present disclosure relates to methods, devices, and systems for generating a signature of a message by a first device based on a secret key and a public key. The method includes generating a first parameter based on a first multiplication operation on the secret key and a first random number. The method further includes generating a first electronic signature based on the first parameter and the public key. The method further includes generating a second parameter based on the first random number, a second random number, and the message. The method further includes generating a second electronic signature based on the first parameter, the second parameter, the second random number, and the first electronic signature. The method further includes outputting, to a second device, the message, the first electronic signature, and the second electronic signature.

18 Claims, 11 Drawing Sheets

(51) Int. Cl.
*H04L 9/30* (2006.01)
*H04L 9/32* (2006.01)

(58) Field of Classification Search
CPC ..... H04L 9/0861; H04L 9/3252; H04L 9/003; H04L 9/002; H04L 2209/72
See application file for complete search history.

(56) References Cited

U.S. PATENT DOCUMENTS

| | | |
|---|---|---|
| 9,300,475 B2 * | 3/2016 | Naito .................... H04L 9/3252 |
| 10,601,578 B2 | 3/2020 | Joye |
| 10,812,260 B2 | 10/2020 | Choi et al. |
| 10,826,710 B2 | 11/2020 | Ghosh et al. |
| 11,075,763 B2 | 7/2021 | Schwarz et al. |
| 2019/0089523 A1 | 3/2019 | Adjedj |

FOREIGN PATENT DOCUMENTS

| | | |
|---|---|---|
| KR | 10-1112570 B1 | 3/2012 |
| TW | 1773960 B | 8/2022 |

OTHER PUBLICATIONS

Nikodem, "DSA Signature Scheme Immune to the Fault Cryptanalysis," CARDIS 2008, LNCS 5189, pp. 61-73, 2008.
Kim et al., "A new digital signature scheme secure against fault attacks," Journal of the Korea Institute of Information Security and Cryptology, 2012, Total 11 pages.
Communication issued May 5, 2025 by the Taiwan Patent Office in Taiwanese Patent Application No. 111114432.

* cited by examiner

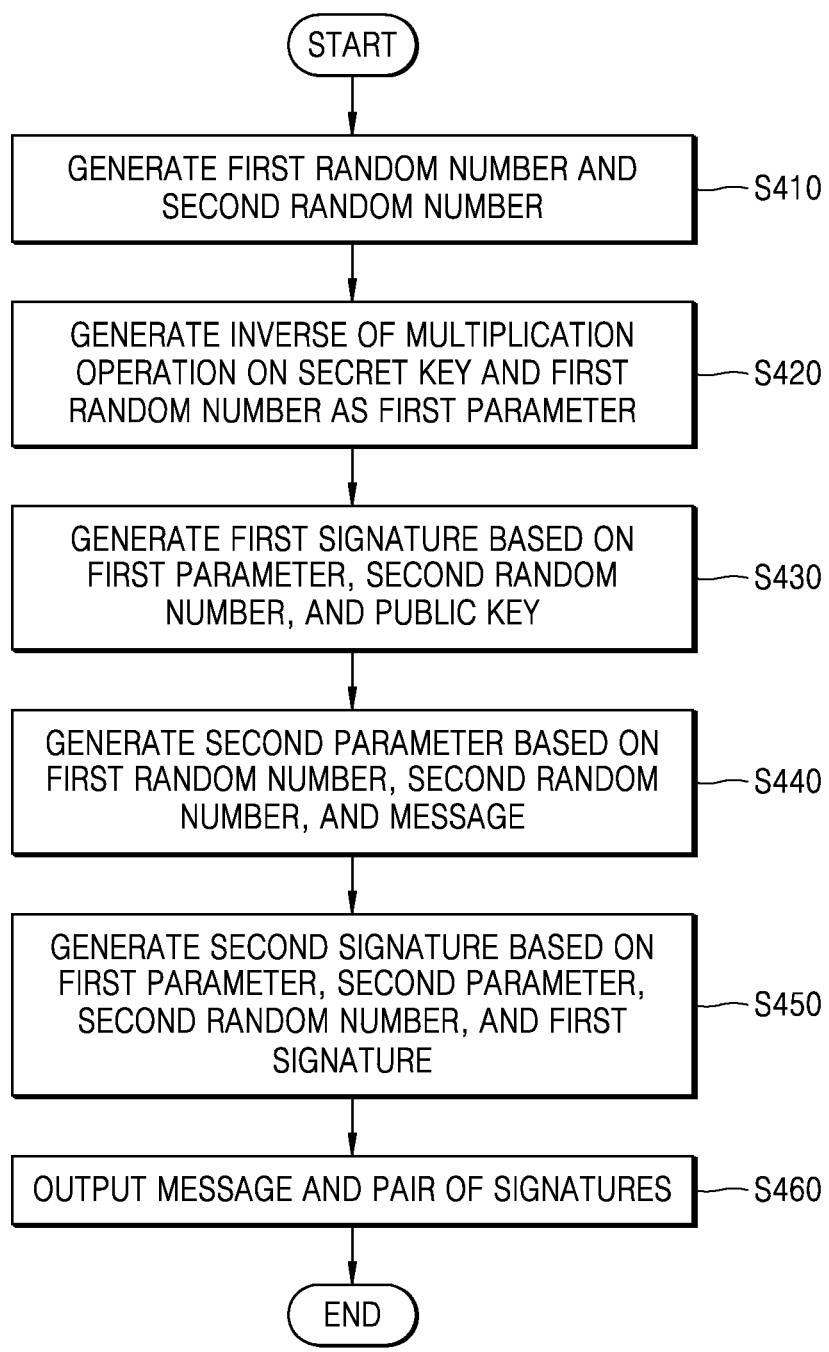

ENCRYPTION DEVICE AND AUTHENTICATION METHOD AND SIGNATURE GENERATING METHOD OF SYSTEM INCLUDING THE SAME

CROSS-REFERENCE TO RELATED APPLICATIONS

This application is based on and claims priority under 35 U.S.C. § 119 to Korean Patent Application No. 10-2021-0050089, filed on Apr. 16, 2021, and to Korean Patent Application No. 10-2022-0000377, filed on Jan. 3, 2022, at the Korean Intellectual Property Office, the disclosures of which are incorporated herein in their entireties by reference.

BACKGROUND

1. Field

The present disclosure relates to an encryption device, and more particularly, to an encryption device for generating a digital signature.

2. Description of the Related Art

An electronic signature may be used for proving a writer (or a sender) of electronic data (or message). For example, the electronic signature may be generated based on a particular electronic signature algorithm using electronic data, a secret key, and a random number. A receiver of the electronic data may validate the electronic data based on the particular electronic signature algorithm using the received electronic data, the received electronic signature, and a public key of a signatory. That is, the receiver of the electronic data may determine whether the received electronic signature is generated using the secret key corresponding to the public key, and it is verified that the received electronic data is generated by the signatory based on the determination result.

A side-channel attack (SCA) may be performed in order to steal the electronic signature while the electronic signature is generated. The SCA may be an attack method of stealing information (e.g., the secret key and/or the random number) of the electronic signature based on physical information of the encryption device for generating the electronic signature.

SUMMARY

The present disclosure relates to an encryption device capable of providing safety against (e.g., preventing) a side-channel attack (SCA), for example, a power analysis attack and/or an error injection attack.

According to an aspect of the present disclosure, there is provided a method of generating a signature of a message by a first device based on a secret key and a public key. The method includes generating a first parameter based on a first multiplication operation on the secret key and a first random number. The method further includes generating a first electronic signature based on the first parameter and a public key. The method further includes generating a second parameter based on the first random number, a second random number, and the message. The method further includes generating a second electronic signature based on the first parameter, the second parameter, the second random number, and the first electronic signature. The method further includes outputting, to a second device, the message, the first electronic signature, and the second electronic signature.

According to another aspect of the present disclosure, there is provided a message authentication method of a system, including a first device and a second device exchanging a message. The method includes generating, by the first device, a first parameter based on a first inverse of a first multiplication operation on a first secret key of the first device and a first random number. The method further includes generating, by the first device, a first electronic signature based on the first parameter, a second random number, and a first public key of the first device. The method further includes generating a second parameter based on the first random number, the second random number, and the message. The method further includes generating a second electronic signature based on the first parameter, the second parameter, the second random number, and the first electronic signature. The method further includes outputting, by the first device to the second device, the message, the first public key, the first electronic signature, and the second electronic signature.

According to another aspect of the present disclosure, there is provided an encryption device for generating a digital signature of a message. The encryption device includes a random number generator configured to generate a first random number and a second random number. The encryption device further includes an electronic signature generating circuit configured to generate a first parameter based on a first multiplication operation on a secret key and the first random number. The electronic signature generating circuit is further configured to generate a second parameter based on a hash value of the message, the first random number, and the second random number. The electronic signature generating circuit is further configured to generate a pair of electronic signatures of the message based on the second random number and a public key for the secret key. The encryption device further includes a memory configured to store the pair of electronic signatures.

BRIEF DESCRIPTION OF DRAWINGS

Embodiments of the present disclosure will be more clearly understood from the following detailed description taken in conjunction with the accompanying drawings in which:

FIG. 4 is a flowchart illustrating an electronic signature generating method according to an embodiment of the present disclosure;

DETAILED DESCRIPTION OF EMBODIMENTS

Hereinafter, various embodiments of the present disclosure are described with reference to the accompanying drawings.

Figure 1:
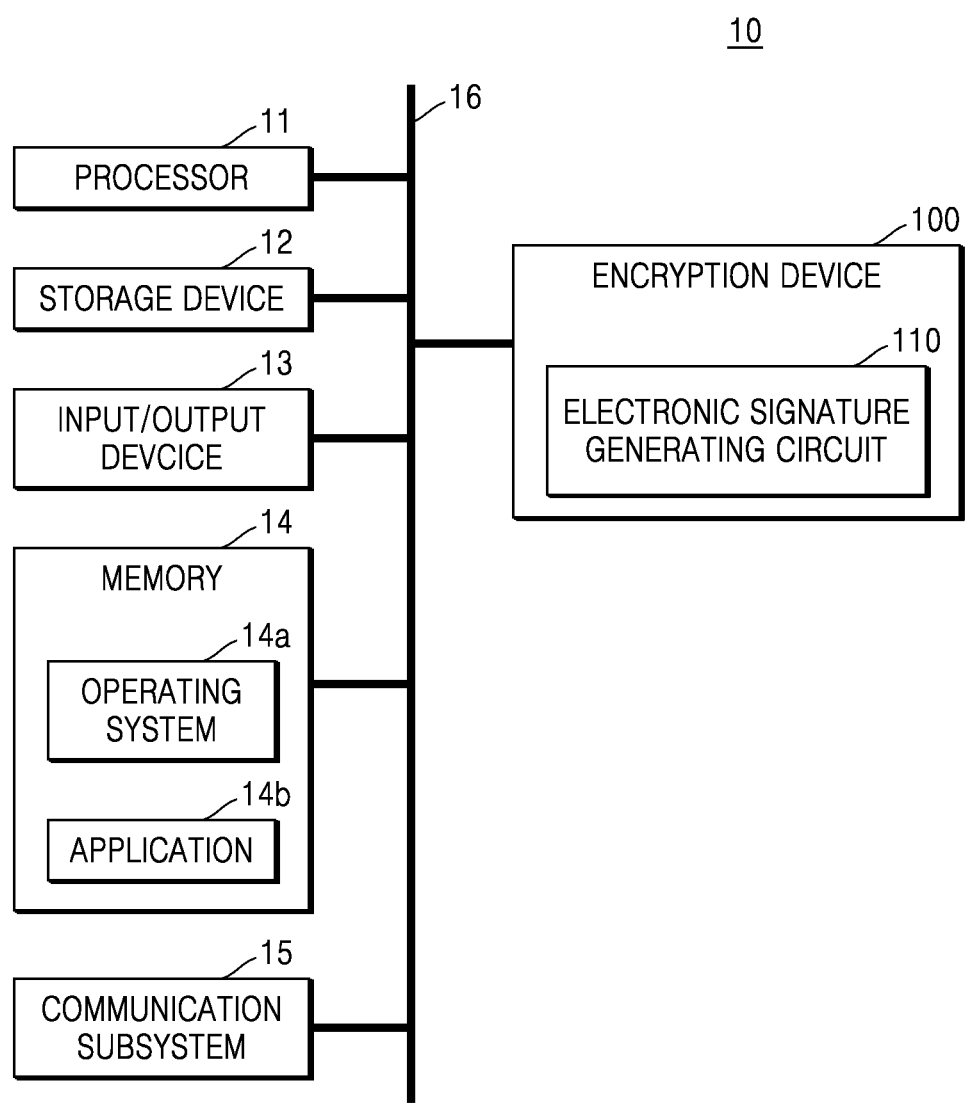
FIG. 1 is a block diagram schematically illustrating an apparatus according to an embodiment of the present disclosure.

FIG. 1 is a block diagram schematically illustrating an apparatus 10 according to an embodiment of the present disclosure.

Referring to FIG. 1, the apparatus 10 may include a processor 11, a storage device 12, an input/output device 13, a memory 14, a communication subsystem 15, a bus 16, and an encryption device 100. The apparatus 10 may include hardware elements that may be electrically coupled with one another (or that may communicate with one another) through the bus 16. That is, the processor 11 may include the hardware elements, and the hardware elements may include one or more general purpose processors and/or one or more special-purpose processors (e.g., digital signal processing chips and/or graphics acceleration processors) configured to implement various hardware circuits and software modules controlling overall operations of the apparatus 1 including the encryption device 100. The input/output device 13 may input and output data to be processed by the processor 11.

The storage device 12 may include local and/or network accessible storages without limitations. For example, the storage device 12 may include a disk drive, a drive array, an optical storage device, or a solid-state storage device. The storage device 12 may be programmed or flash-updated and may be implemented so that various file systems and a database structure may be applied.

The communication subsystem 15 may include a modem, a (wireless or wired) network card, an infrared communication device, a wireless communication device, and/or a chipset (e.g., a Bluetooth device, an 802.11 device, a Wireless-Fidelity (Wi-Fi) device, a Worldwide Interoperability for Microwave Access (WiMax) device, and/or a cellular communication device (e.g., 3G, LTE, 4G, 5G)) without limitations. The communication subsystem 15 may allow data on an electronic signature generated according to an embodiment of the present disclosure to be exchanged with (or transmitted to) a network, other computer systems/devices, and/or any other devices.

The memory 14 may include an operating system 14a and an application 14b including device drivers, executable libraries, and/or program code. The operating system 14a and the application 14b may be implemented by executing code and/or instructions as a software element by a computer (or a processor in the computer).

The encryption device 100, according to an embodiment of the present disclosure, is a device for encrypting data for security that may include an electronic signature generating circuit 110 configured to generate the electronic signature. The electronic signature generating circuit 110 may generate the electronic signature of data based on an electronic signature algorithm. For example, the electronic signature algorithm may be a public key cryptography algorithm, and may include a Rivest-Shamir-Adleman (RSA) algorithm, an ElGamal algorithm, a digital signature algorithm (DSA), an elliptic curve DSA (ECDSA), or the like.

A side-channel attack (SCA) may be performed on the electronic signature generating circuit 110 or the encryption device 100 while the electronic signature is generated. The SCA may refer to an attack method of stealing information (e.g., a secret key and/or a random number) of the electronic signature by processing physical information (e.g., sound, power, and/or operation time) generated during the operation of generating the electronic signature. The SCA may include an error injection attack, a power analysis attack, and/or a time attack, for example. The error injection attack may be a method of finding out the secret key and/or the random number by physically injecting an error into the encryption device 100 while the operation of generating the electronic signature is performed and analyzing an encryption result obtained by the injected error. The power analysis attack may be a method of finding out the secret key and/or the random number by analyzing power consumption of the encryption device 100 while the operation of generating the electronic signature is performed. For example, during the power analysis attack, an attacker may steal information on the secret key and/or the random number by analyzing power while the operation of generating the electronic signature using the secret key and/or the random number is performed. The time attack may be a method of finding out the secret key and/or the random number by analyzing time spent on performing the operation of generating the electronic signature.

In an embodiment, the electronic signature generating circuit 110 may include a logic block implemented by hardware logic and/or designed by logical synthesis. Alternatively or additionally, the electronic signature generating circuit 110 may include a software block implemented by a set of code and/or instructions stored in a non-transitory computer-readable storage medium such as the storage device 12 and being executed by the encryption device 100. In other embodiments, the non-transitory computer-readable storage medium may be provided to a device (e.g., a removable medium such as a compact disk or a universal serial bus (USB)) separate from a computer device or an installation package so as to be used for programming or applying a general purpose computer in which the set of code and/or instructions are stored. The set of code and/or instructions may be in the form of executable code that may be executed by the encryption device 100 or in the form of sources and/or installable code that may be executed during compilation and/or installation in the encryption device 100.

The electronic signature generating circuit 110, according to an embodiment of the present disclosure, may perform an operation on the secret key and/or the random number and may generate the electronic signature based on a result of the operation. The secret key may be referred to as a private key.

Power consumption of the encryption device 100 may have a random characteristic while the random number and the secret key are calculated. As such, the electronic signature generating circuit 110 may provide safety against the SCA (e.g., the power analysis attack) when generating the electronic signature based on a result of a logical operation on the secret key and the random number.

Alternatively or additionally, the electronic signature generating circuit 110, according to an embodiment of the present disclosure, may generate the electronic signature based on a result of an operation on two random numbers.

The result of the operation (e.g., division operation) on the two random numbers may correspond to a random number that may not be calculated although partial information on each of the two random numbers is revealed. As such, the electronic signature generating circuit 110 may provide safety against the SCA (e.g., the error injection attack for finding out the partial information on each of the two random numbers) when generating the electronic signature based on the result of the operation on the two random numbers.

According to embodiments, the encryption device 100 may be referred to as an encryption processor and may be integrated with the processor 11 to compose one block.

Figure 2:
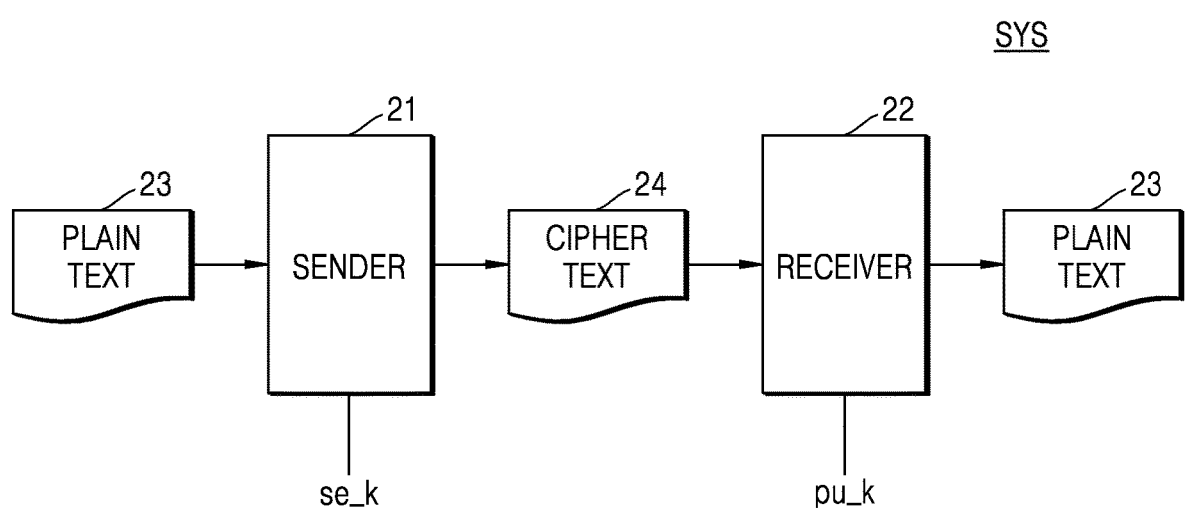
FIG. 2 is a view illustrating a cryptographic system for describing a process of generating an electronic signature according to an embodiment of the present disclosure.

FIG. 2 is a view illustrating a cryptographic system SYS for describing a process of generating an electronic signature according to an embodiment of the present disclosure. A sender 21 of FIG. 2 may include the apparatus 10 of FIG. 1.

Referring to FIG. 2, the cryptographic system SYS may include the sender 21 representing an encryption side and a receiver 22 representing a decryption side. In the cryptographic system SYS, each side may receive two keys, that is, a secret key se_k and a public key pu_k. The sender 21 may generate a cipher text 24 (e.g., the electronic signature) by encrypting a plain text 23 using the secret key se_k. In the present disclosure, the plain text 23 may be referred to as a message or electronic data. For example, the sender 21 may generate the electronic signature (e.g., the cipher text 24) based on a predetermined electronic signature algorithm using the plain text 23, the secret key se_k, and a random number. As described above with reference to FIG. 1, in some embodiments, the sender 21 may generate the electronic signature 24 based on an operation on the secret key se_k and the random number. In some embodiments, the sender 21 may generate the electronic signature 24 based on a result of operation on two random numbers. The generated cipher text 24 may be transmitted to the receiver 22. The receiver 22 may determine whether the received cipher text 24 is generated by the sender 21 using the public key pu_k of the sender 21 and may generate the plain text 23 by decrypting the cipher text 24. In some embodiments, the sender 21 may generate the electronic signature 24 using the public key pu_k as well as the secret key se_k in accordance with the electronic signature algorithm.

The cryptographic system SYS according to an embodiment of the present disclosure may adopt at least one of various electronic signature algorithms. For example, the cryptographic system SYS may include one of an RSA electronic signature algorithm, an ElGamal electronic signature algorithm, a DSA, a Schnorr electronic signature algorithm, a Guillou-Quisquater electronic signature algorithm, an ESIGN electronic signature algorithm, a Korean Certificate-based Digital Signature Algorithm (KCDSA) electronic signature algorithm, and an ECDSA.

Figure 3A:
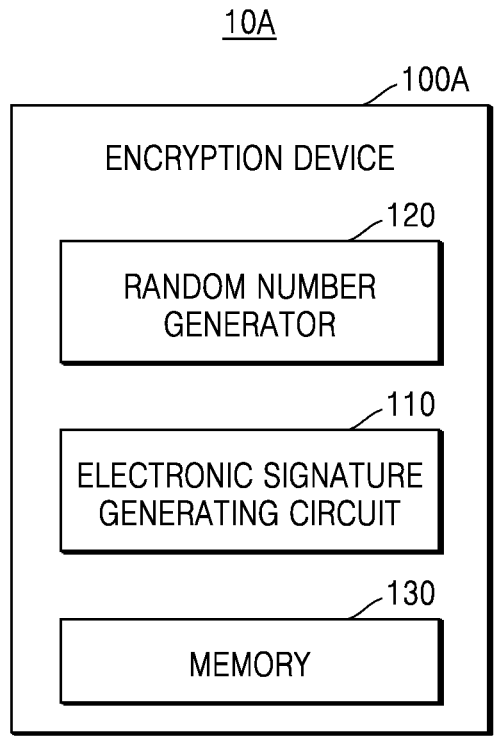
FIGS. 3A and 3B are block diagrams illustrating encryption devices according to an embodiment of the present disclosure.
Figure 3B:
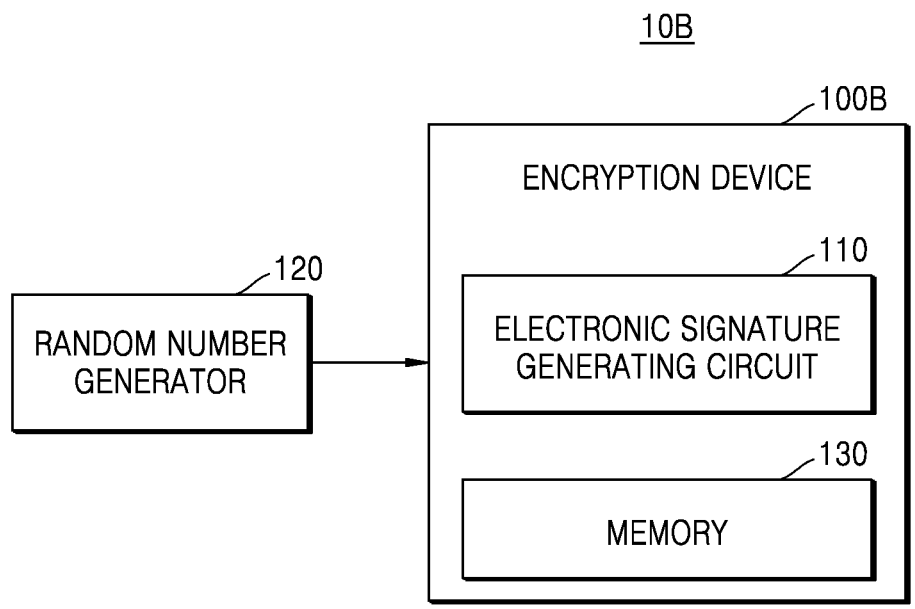

FIGS. 3A and 3B are block diagrams illustrating encryption devices 100A and 100B, respectively, according to an embodiment of the present disclosure. The encryption devices 100A and 100B of FIGS. 3A and 3B may be an example of the encryption device 100 of FIG. 1. The encryption devices 100A and 100B may be described as adopting (e.g., implementing) a DSA, which is only one exemplary embodiment. However, the present disclosure is not limited thereto and may be applied to various electronic signature algorithms, as described in reference to FIG. 2, for example.

Referring to FIG. 3A, an apparatus 10A may include an encryption device 100A. The encryption device 100A may include an electronic signature generating circuit 110, a random number generator 120, and memory 130. The electronic signature generating circuit 110 of FIG. 3A may be the same as or similar in many respects to the electronic signature generating circuit 110 described above in reference to FIG. 1, and may include additional features not mentioned above. In some embodiments, the electronic signature generating circuit 110 may perform a hash operation, a modular operation, a multiplication operation, an addition operation, a division operation, or an exponentiation operation, among others.

In some embodiments, the encryption device 100A may generate a public key and a secret key used for an electronic signature and may generate the electronic signature based on the public key and the secret key. For example, the electronic signature generating circuit 110 may generate public keys pu_k (e.g., p, q, g, and y) and a secret key se_k (e.g., d) based on Algorithm 1.

| [Algorithm 1] |   |
|---|---|
| 1. | Select a prime number q, such that $2^{159} < q < 2^{160}$. |
| 2. | Choose t so that $0 \leq t \leq 8$, and select a prime number p where $2^{511+64t} < p < 2^{512+64t}$, with the property that q divides (p − 1). |
| 3. | Select a generator g of the unique cyclic group of order q in $Z_p^*$. |
| 4. | Select a random integer d, such that $1 \leq d \leq q − 1$. |
| 5. | $y = g^d \bmod p$. |

In some embodiments, the encryption device 100A may receive at least one of the public keys pu_k (e.g., p, q, g, and y) and/or the secret key se_k (e.g., d) from another device and/or source (e.g., memory 130) without generating the same.

In some embodiments, the encryption device 100A may generate a pair of electronic signatures r and s for a message m based on Algorithm 2. In the present disclosure, r may be referred to as a first electronic signature and s may be referred to as a second electronic signature.

| [Algorithm 2] |   |
|---|---|
| 1. | Select a random secret integer k, such that $0 < k < q$. |
| 2. | $r = (g^k \bmod p) \bmod q$. If r = 0 then go to step 1. |
| 3. | $k^{-1} \bmod q$. |
| 4. | $s = k^{-1}(h(m) + dr) \bmod q$. If s = 0 then go to step 1. |
| 5. | Signature for m is the pair (r,s). |

Here, h( ) may represent a hash function and m may represent a message (e.g., plain text 23).

Based on Algorithm 2, the random number generator 120 may generate a random number k that satisfies 0<k<q, where q may represent a prime number generated in accordance with Algorithm 1.

The electronic signature generating circuit 110 may generate the first electronic signature r. For example, referring to Algorithm 2, the electronic signature generating circuit 110 may generate the first electronic signature r by performing an exponentiation operation based on a public key g and the random number k and performing a modular operation based on a result of the exponentiation operation and prime numbers p and q.

Continuing to refer to Algorithm 2, the electronic signature generating circuit 110 may perform a modular operation based on an inverse $k^{-1}$ of the random number k and the prime number q.

The electronic signature generating circuit 110 may generate the second electronic signature s. For example, referring to Algorithm 2, the electronic signature generating circuit 110 may calculate a hash function h(m) for the message m, may calculate d×r by performing a first multiplication operation on the secret key d and the signature r, and may generate the second electronic signature s by performing an addition operation on h(m) and d×r, performing a second multiplication operation on a result of the addition operation and the inverse $k^{-1}$ of the random number k, and performing a modular operation based on a result of the second multiplication operation and the prime number q. In some embodiments, the inverse $k^{-1}$ may be replaced by $k^{-1}$ modq calculated in step 3 of Algorithm 2.

Alternatively or additionally, the encryption device 100A, according to an embodiment of the present disclosure, may generate a pair of electronic signatures r and s in accordance with Algorithm 3. As described below in reference to Equation 1 and Equation 2, the pair of electronic signatures r and s generated in accordance with Algorithm 3 may be represented by the same parameters as those of the pair of electronic signatures r and s generated in accordance with Algorithm 2.

Algorithm 3
1. Select random number $k_1$, $k_2$
   with $0 < k_1 \cdot k_2 < \frac{q}{2}$
2. $t_1 = (dk_1)^{-1} \bmod q$
3. $v = y^{t_1} \bmod p$
4. $r = (v^{k_2} \bmod p) \bmod q$
5. If r = 0 then go to step1
6. $t_2 = h(m)k_1 k_2^{-1} \bmod q$
7. $s = t_2 + r(t_1 k_2)^{-1} \bmod q$ For example, referring to Algorithm 3, the random number generator 120 may generate a first random number $k_1$ and a second random number $k_2$. Because the first random number $k_1$ and the second random number $k_2$ are less than q/2, a random number generated by an operation (e.g., multiplication operation or division operation) on the first random number $k_1$ and the second random number $k_2$ may be less than q.

Referring to Algorithm 3, the electronic signature generating circuit 110 may generate a first parameter $t_1$ by performing a multiplication operation on the secret key d and the first random number $k_1$, calculating an inverse of a result of the multiplication operation, and performing a modular operation based on the inverse and the prime number q.

Continuing to refer to Algorithm 3, the electronic signature generating circuit 110 may generate an intermediate parameter v by performing an exponentiation operation based on the public key y and the first parameter $t_1$ and performing a modular operation based on a result of the exponentiation operation and the prime number p.

Referring to Algorithm 3, the electronic signature generating circuit 110 may generate the first electronic signature r by performing an exponentiation operation based on the intermediate parameter v and the second random number $k_2$ and performing a modular operation based on a result of the exponentiation operation and the prime numbers p and q.

The electronic signature generating circuit 110 may generate a second parameter $t_2$ based on the hash function h(m) for the message m, the first random number $k_1$, the second random number $k_2$, and the prime number q. For example, the electronic signature generating circuit 110 may generate the second parameter $t_2$ by performing a multiplication operation on the hash function h(m), the first random number $k_1$, and an inverse $k_2^{-1}$ of the second random number $k_2$ and performing a modular operation based on a result of the multiplication operation and the prime number q.

The electronic signature generating circuit 110 may generate the second electronic signature s based on the first parameter $t_1$, the second parameter $t_2$, the first electronic signature r, the second random number $k_2$, and the prime number q. For example, the electronic signature generating circuit 110 may generate the second electronic signature s by performing a first multiplication operation on the first parameter $t_1$ and the second random number $k_2$, performing a second multiplication operation on an inverse of a result of the first multiplication operation and the first electronic signature r, performing a modular operation on a result of the second multiplication operation and the prime number q, and performing an addition operation on a result of the modular operation and the second parameter $t_2$.

Referring to Equation 1 and Equation 2, the pair of electronic signatures r and s generated by Algorithm 3 may be represented by the same parameters as those of the pair of electronic signatures r and s generated by Algorithm 2.

[Equation 1]

$$r = (v^{k_2} \bmod p) \bmod q = ((y^{t_1})^{k_2} \bmod p) \bmod q$$
$$= (y^{d^{-1} k_1^{-1} k_2} \bmod p) \bmod q$$
$$= ((g^d)^{d^{-1} k_1^{-1} k_2} \bmod p) \bmod q$$
$$= (g^{k_1^{-1} k_2} \bmod p) \bmod q$$
$$= (g^k \bmod p) \bmod q$$

[Equation 2]

$$s = t_2 + r(t_1 k_2)^{-1} \bmod q$$
$$= h(m)(k_1 k_2^{-1}) + r(d^{-1} k_1^{-1} k_2)^{-1} \bmod q$$
$$= (k_1 k_2^{-1})(h(m) + dr) \bmod q$$
$$= k^{-1}(h(m) + dr) \bmod q$$

That is, the electronic signature generating circuit 110 operating based on Algorithm 3, according to an embodiment of the present disclosure, may be compatible with an electronic signature generating circuit operating based on Algorithm 2.

Referring to Equation 2, when the electronic signature generating circuit 110 generates the pair of electronic signatures r and s based on Algorithm 3, the random number k may be generated by an operation between the first random number $k_1$ and the second random number $k_2$. As such, when an SCA (e.g., the error injection attack) for stealing partial information on the first random number $k_1$ or the second random number $k_2$ is attempted during an electronic signature generating process, the random number k may be safely protected, and the electronic signature generating circuit 110 may provide safety against the SCA.

Referring to Algorithm 3, because the electronic signature generating circuit 110 performs multiplication operation on the secret key d and the first random number $k_1$, when an SCA (e.g., power analysis attack) for stealing the secret key d is attempted, the secret key d may be safely protected. As such, the electronic signature generating circuit 110 may provide safety against the SCA.

The random number generator 120 may store random numbers in the memory 130 and the electronic signature generating circuit 110 may store data obtained during the electronic signature generating process in the memory 130.

Referring to FIG. 3B, in comparison with FIG. 3A, in an apparatus 10B, a random number generator 120 may be implemented as a device separate from an encryption device 100B. The random number generator 120 may receive a request to generate a random number k required for generating an electronic signature from the encryption device 100B, may generate a plurality of random numbers in response to the request, and may provide the plurality of generated random numbers to the encryption device 100B.

FIG. 4 is a flowchart illustrating an electronic signature generating method according to an embodiment of the present disclosure. The electronic signature generating method may include a plurality of operations S410 to S460 and may be performed by the encryption devices 100, 100A, and 100B of FIGS. 1, 3A, and 3B.

In operation S410, the encryption device 100 may generate the first random number $k_1$ and the second random number $k_2$. The first random number $k_1$ and the second random number $k_2$ may be less than the prime number q selected in accordance with Algorithm 1. In some embodiments, the encryption device 100 may generate the public keys pu_k (e.g., p, q, g, and y) and the secret key se_k (e.g., d) in accordance with Algorithm 1 and/or may obtain the public keys and/or the secret key from another device and/or source (e.g., memory 130) without generating the same.

In operation S420, the encryption device 100 may generate an inverse of a multiplication operation on the secret key se_k (e.g., d) and the first random number $k_1$ as the first parameter $t_1$. For example, the encryption device 100 may perform a modular operation based on the inverse of the multiplication operation on the secret key se_k (e.g., d) and the first random number $k_1$ and the prime number q and may generate a result of the modular operation as the first parameter $t_1$. Because the multiplication operation on the secret key se_k (e.g., d) and the first random number $k_1$ is performed, a result of the multiplication operation may also have a random characteristic. As such, the electronic signature generating method, according to an embodiment of the present disclosure, may provide safety against an SCA.

In operation S430, the encryption device 100 may generate the first electronic signature r based on the first parameter $t_1$, the second random number $k_2$, and the public key pu_k. For example, the encryption device 100 may perform the exponentiation operation based on the public key y and the first parameter $t_1$, may perform the modular operation based on the result of the exponentiation operation and the prime number p, and may generate the intermediate parameter v based on a result to the modular operation as described in Algorithm 3. The encryption device 100 may generate the first electronic signature r by performing the exponentiation operation based on the intermediate parameter v and the second random number $k_2$ and performing the modular operation based on the result of the exponentiation operation and the prime numbers p and q.

In operation S440, the encryption device 100 may generate the second parameter $t_2$ based on the first random number $k_1$, the second random number $k_2$, and the message m. For example, the encryption device 100 may generate the second parameter $t_2$ by generating the hash function h(m) for the message m, performing a multiplication operation based on the hash function h(m), the first random number $k_1$, and an inverse $k_2^{-1}$ of the second random number $k_2$, and performing a modular operation based on a result of the multiplication operation and the prime number q as described in Algorithm 3.

In operation S450, the encryption device 100 may generate the second electronic signature s based on the first parameter $t_1$, the second parameter $t_2$, the second random number $k_2$, and the first electronic signature r. For example, the encryption device 100 may generate the second electronic signature s by performing the first multiplication operation on the first parameter $t_1$ and the second random number $k_2$, performing the second multiplication operation on the inverse of the result of the first multiplication operation and the first electronic signature r, performing a modular operation based on a result of the second multiplication operation and the prime number q, and performing an addition operation on a result of the modular operation and the second parameter $t_2$ as described in Algorithm 3.

In operation S460, the encryption device 100 may output the message m and the pair of electronic signatures r and s.

Based on Equation 1 and Equation 2, the pair of electronic signatures r and s generated by Algorithm 3 may be understood as values for the random number k and the random number k may be determined based on an operation on the first random number $k_1$ and the second random number $k_2$. While the plurality of operations S410 to S460 are performed, when an SCA for obtaining partial information on each of the first random number $k_1$ and the second random number $k_2$ is performed, because the random number k is determined based on the operation on the first random number $k_1$ and the second random number $k_2$, information on the random number k may be safely protected.

Figure 5:
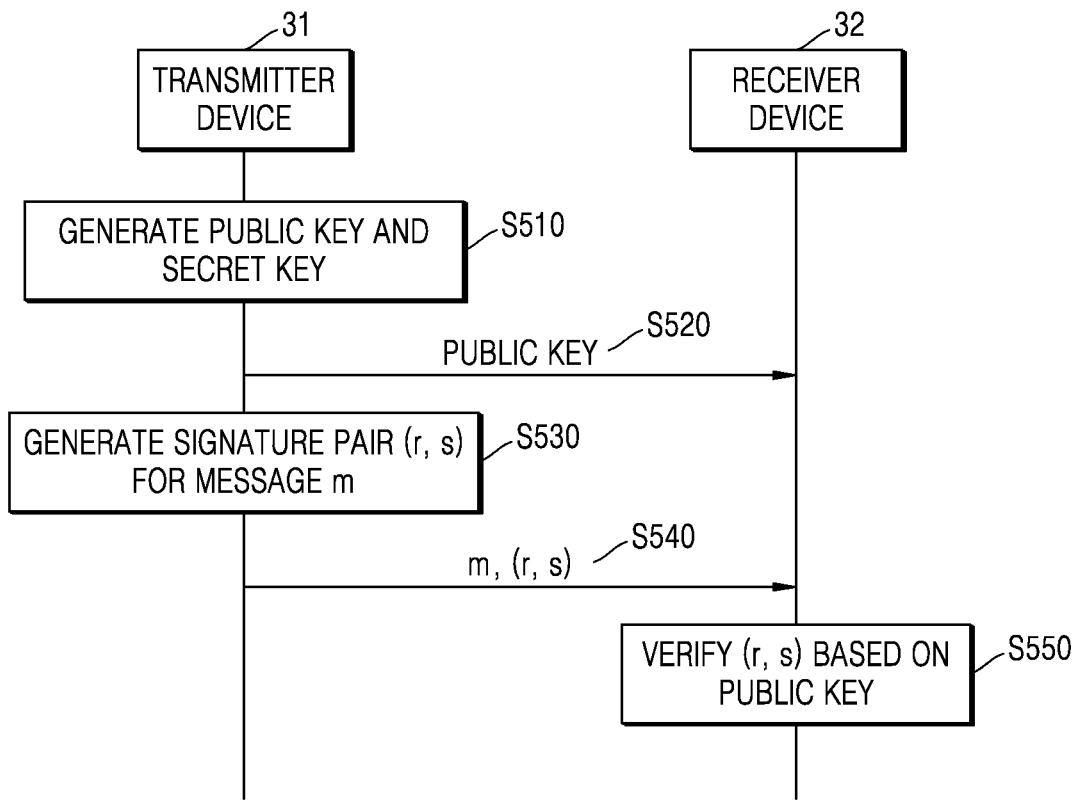
FIG. 5 is a view illustrating a method of operating an electronic signature system according to an embodiment of the present disclosure.

FIG. 5 is a view illustrating a method of operating an electronic signature system according to an embodiment of the present disclosure. For example, FIG. 5 is a view illustrating a method of operating an electronic signature system including a transmitter device 31 and a receiver device 32. The transmitter device 31 of FIG. 5 may include the encryption device 100 of FIG. 1, the encryption device 100A of FIG. 3A, or the encryption device 100B of FIG. 3B.

The method of operating the electronic signature system of FIG. 5 may include a plurality of operations S510 to S550. Referring to FIG. 5, in operation S510, the transmitter device 31 may generate a public key and a secret key. For example, the transmitter device 31 may generate the public key and the secret key based on Algorithm 1.

In operation S520, the transmitter device 31 may transmit the public key to the receiver device 32.

In operation S530, the transmitter device 31 may generate the pair of electronic signatures r and s for the message m. The transmitter device 31, according to an embodiment of the present disclosure, may generate the pair of electronic signatures r and s in accordance with Algorithm 3. For example, the transmitter device 31 may generate the pair of electronic signatures r and s based on the first random number $k_1$ and the second random number $k_2$. Alternatively or additionally, the transmitter device 31 may generate the pair of electronic signatures r and s based on the multiplication operation on the secret key d and the first random number $k_1$.

In operation S540, the transmitter device 31 may transmit the generated data to the receiver device 32 by combining the message m with the pair of electronic signatures r and s.

In operation S550, the receiver device 32 may validate the pair of electronic signatures r and s based on the public key. For example, the receiver device 32 may validate the pair of electronic signatures r and s based on Algorithm 4.

| [Algorithm 4] |
| --- |
| Verification |
| 1. $w = s^{-1} \bmod q$. |
| 2. $v_1 = h(m)w \bmod q$, $v_2 = rw \bmod q$ |
| 3. $v_3 = (g^{v_1} y^{v_2} \bmod p) \bmod q$ |
| 4. Accept the signature if $v_3 = r$ |

The receiver device 32 may perform a modular operation based on an inverse $s^{-1}$ of the second electronic signature s and the prime number q and may generate a result of the modular operation as a first validation parameter w.

The receiver device 32 may generate a second validation parameter vs by performing a multiplication operation on the hash function h(m) for the message m and the first validation parameter wand performing a modular operation based on a result of the multiplication operation and the prime number q.

The receiver device 32 may generate a third validation parameter $v_1$ by performing a multiplication operation on the first electronic signature rand the first validation parameter wand performing a modular operation based on a result of the multiplication operation and the prime number q.

The receiver device 32 may generate a fourth validation parameter vs by performing a first exponentiation operation on the public key g and the second validation parameter $v_1$, performing a second exponentiation operation on the public key y and the third validation parameter $v_2$, performing a multiplication operation on a result of the first exponentiation operation and a result of the second exponentiation operation, and performing a modular operation on a result of the multiplication operation and the prime numbers p and q.

The receiver device 32 may determine whether an electronic signature is valid by comparing the fourth validation parameter $v_3$ with the first electronic signature r. For example, the receiver device 32 may determine that the electronic signature is valid when the fourth validation parameter $v_3$ is equal to the first electronic signature r. Alternatively or additionally, the receiver device 32 may determine that the electronic signature is invalid when the fourth validation parameter $v_3$ is not equal to the first electronic signature r. If or when the electronic signature is determined to be valid, the determination may indicate that the message m is generated by the transmitter device 31, and that the receiver device 32 may trust the message m.

Figure 6:
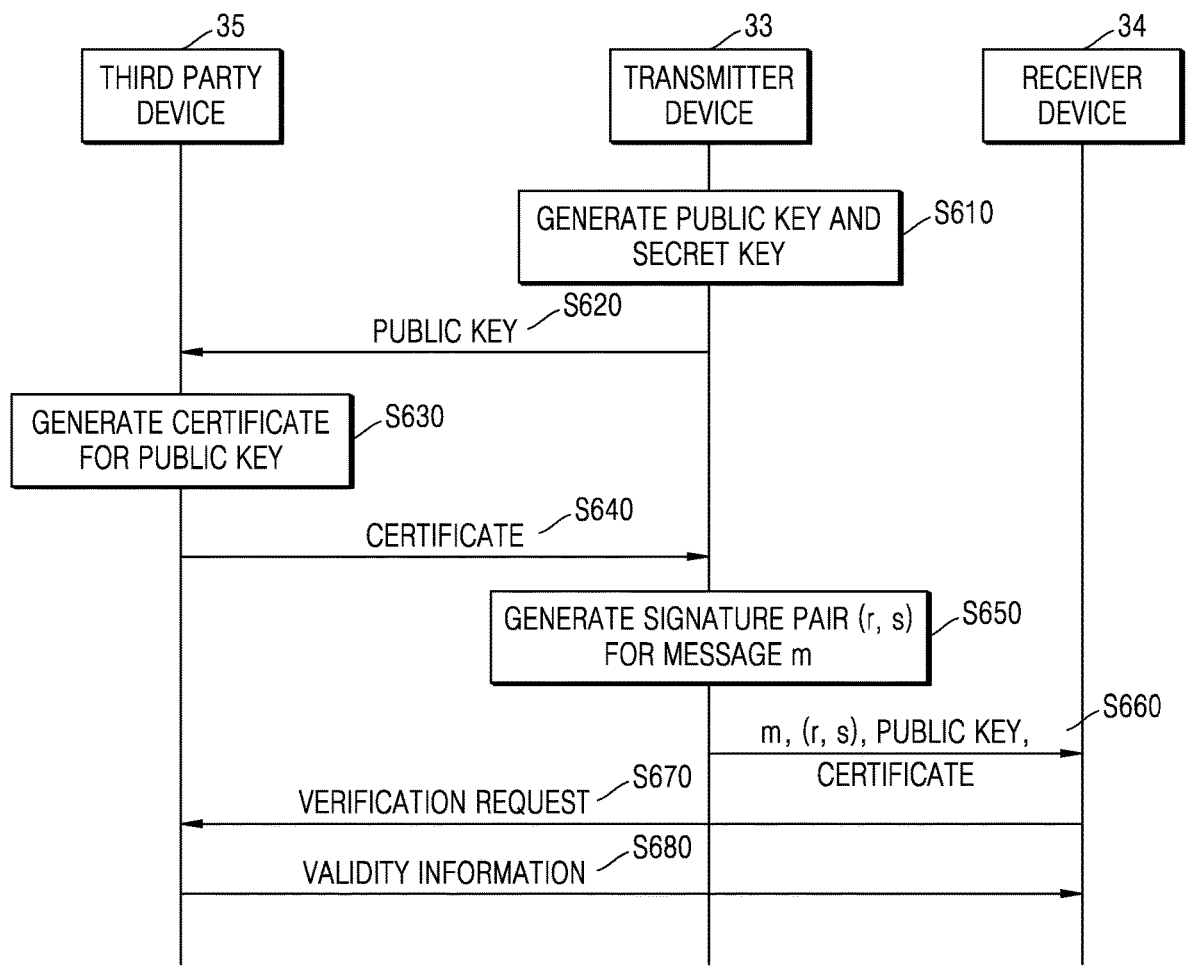
FIG. 6 is a view illustrating a method of operating an electronic signature system according to an embodiment of the present disclosure.

FIG. 6 is a view illustrating a method of operating an electronic signature system according to an embodiment of the present disclosure. For example, FIG. 6 is a view illustrating a method of operating an electronic signature system including a transmitter device 33, a receiver device 34, and a third party device 35. The transmitter device 33 of FIG. 6 may include the encryption device 100 of FIG. 1, the encryption device 100A of FIG. 3A, or the encryption device 100B of FIG. 3B.

The method of operating the electronic signature system of FIG. 6 may include a plurality of operations S610 to S680. Referring to FIG. 6, in operation S610, the transmitter device 33 may generate a public key and a secret key based on Algorithm 1.

In operation S620, the transmitter device 33 may transmit the public key to the third party device 35. The third party device 35 may be referred to as at least one of a certificate authority (CA), a registration authority (RA), and a validation authority (VA). The transmitter device 33 may transmit identity information of the transmitter device 33 (and/or identity information of a user of the transmitter device 33) to the third party device 35 together with the public key and may request the third party device 35 to issue a certificate.

In operation S630, the third party device 35 may generate the certificate by checking the identity information and creating the electronic signature for the public key and the identity information of the transmitter device 33 based on a unique secret key of the third party device 35. In operation S640, the third party device 35 may transmit the certificate to the transmitter device 33.

In operation S650, the transmitter device 33 may generate the pair of electronic signatures r and s for the message m. The transmitter device 33, according to an embodiment of the present disclosure, may generate the pair of electronic signatures rand s by the same method as that of the transmitter device 31 of FIG. 5.

In operation S660, the transmitter device 33 may transmit the message m, the pair of electronic signatures rand s, and the public key and the certificate of the transmitter device 33 to the receiver device 34.

In operation S670, the receiver device 34 may request the third party device 35 to validate the pair of electronic signatures rand s. For example, in operation S670, the receiver device 34 may transmit the message m and the pair of electronic signatures rand s to the third party device 35 and the third party device 35 may generate validity information of the pair of electronic signatures rand s by validating the pair of electronic signatures r and s based on the public key of the transmitter device 33. The third party device 35 may generate the validity information based on Algorithm 4, for example.

In operation S680, the third party device 35 may transmit the validity information to the receiver device 34. The validity information may certify that the pair of electronic signatures rand s are generated by the transmitter device 33 and are for the message m.

In some embodiments, operations S670 and S680 may be omitted and the receiver device 34 may determine whether the public key received from the transmitter device 33 is reliable by validating the certificate based on the public key of the third party device 35. That is, the receiver device 34 may obtain the authenticated public key of the transmitter device 33 by validating the certificate based on the public key of the third magnetic device 35. The receiver device 34 may verify that the pair of electronic signatures r and s for the message m are generated by the transmitter device 33 in accordance with Algorithm 4 based on the authenticated public key of the transmitter device 33, the message m, and the pair of electronic signatures r and s, where the pair of electronic signatures r and s are generated based on the authentic message m.

Figure 7A:
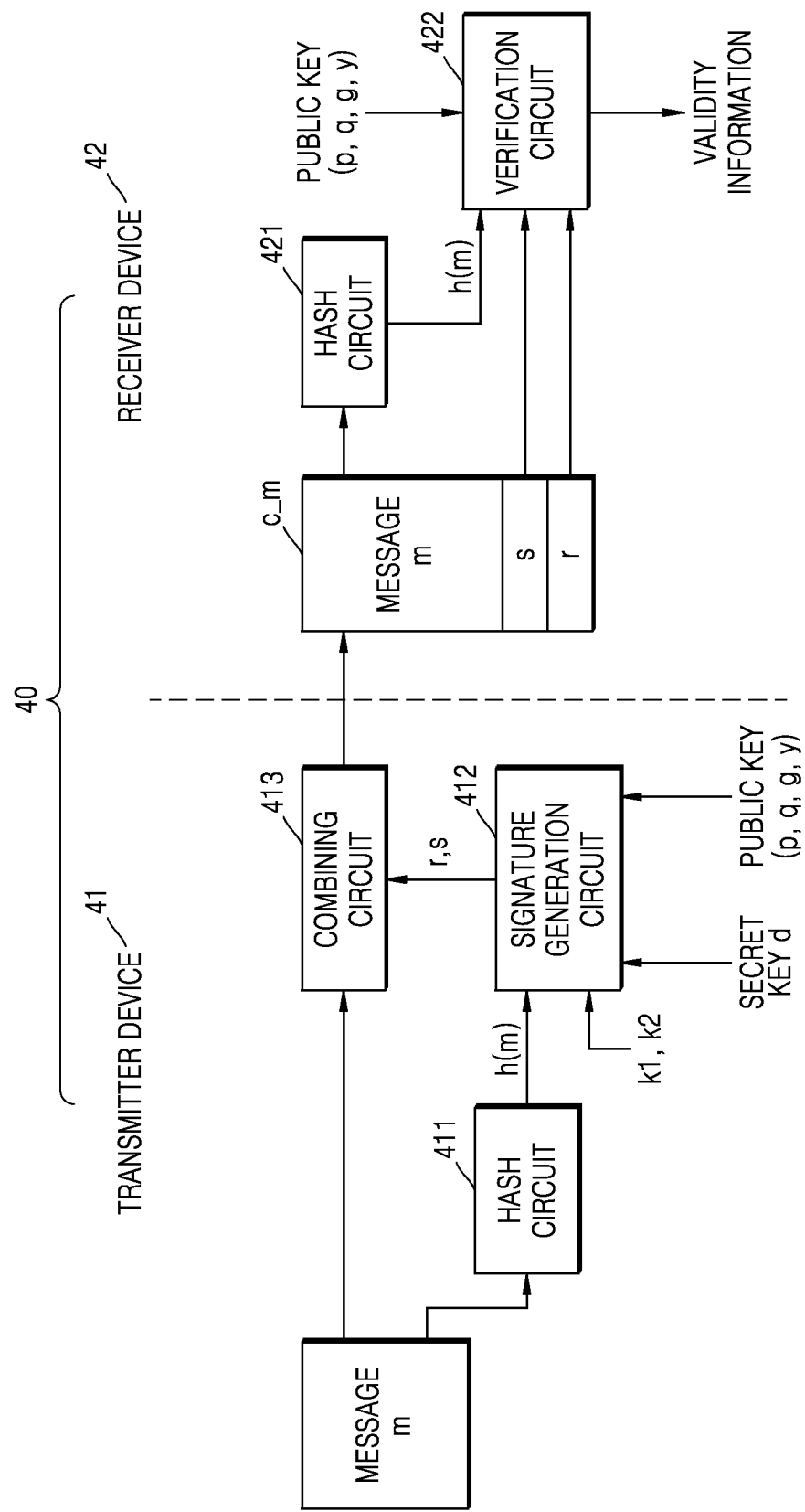
FIGS. 7A and 7B are block diagrams illustrating electronic signature systems according to an embodiment of the present disclosure.
Figure 7B:
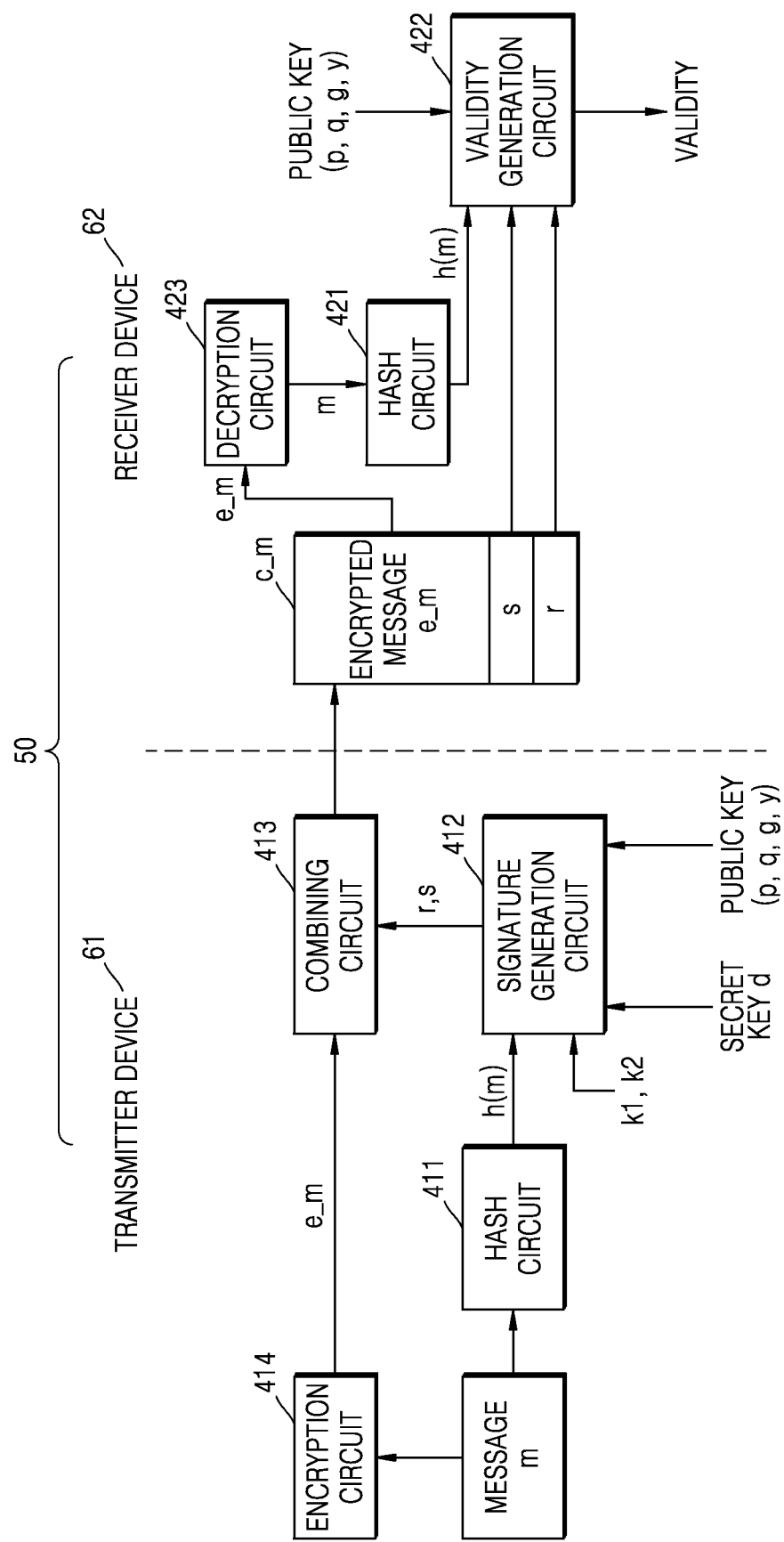

FIGS. 7A and 7B are block diagrams illustrating electronic signature systems 40 and 50 according to an embodiment of the present disclosure.

Referring to FIG. 7A, the electronic signature system 40 may include a transmitter device 41 and a receiver device 42. The transmitter device 41 may be the transmitter device 31 of FIG. 5 or the transmitter device 33 of FIG. 6 and the receiver device 42 may be the receiver device 32 of FIG. 5 or the receiver device 34 of FIG. 6.

The transmitter device 41 may generate the pair of electronic signatures rand s for the message m. The transmitter device 41 may include a hash circuit 411, a signature generation circuit 412, and a combining circuit 413.

The hash circuit 411 may receive the message m and may output the hash function h(m). The hash circuit 411 may generate the hash function h(m) by performing a hash operation on the message m based on a hash algorithm. The hash algorithm may generate a hash value having a fixed length by converting a message m having an arbitrary length. The hash algorithm may be referred to as a hash function or a message digest function, and the hash function h(m) may be referred to as a message digest. For example, the hash algorithm may be at least one of MD-5, SHA-1, and the like.

The signature generation circuit 412 may generate the pair of electronic signatures rand s for the hash function h(m)

based on the first random number $k_1$, the second random number $k_2$, the secret key d, and the public keys p, q, g, and y. In some embodiments, the transmitter device 41 may receive at least one of the first random number $k_1$, the second random number $k_2$, the secret key d, and the public keys p, q, g, and y from the outside. In some embodiments, the transmitter device 41 may further include a random number generator and the random number generator may generate the first random number $k_1$ and the second random number $k_2$. In some embodiments, the transmitter device 41 may further include a key generation circuit (not shown) and the key generation circuit may generate the secret key d and the public keys p, q, g, and y.

The signature generation circuit 412 may generate the pair of electronic signatures r and s based on Algorithm 3, for example. The signature generation circuit 412 may transmit the pair of electronic signatures r and s to the combining circuit 413.

Referring to Algorithm 3, the signature generation circuit 412 may perform the multiplication operation on the first random number $k_1$ and the secret key d and may generate the pair of electronic signatures r and s based on the result of the multiplication operation. The signature generation circuit 412 may prevent an error injection attack from obtaining the secret key d by performing the multiplication operation on the first random number $k_1$ and the secret key d.

Referring to Algorithm 3, Equation 1, and Equation 2, because the signature generation circuit 412 may generate the random number k for calculating the pair of electronic signatures r and s based on the first random number $k_1$ and the second random number $k_2$, the signature generation circuit 412 may prevent an error injection attack from obtaining the random number k.

The combining circuit 413 may generate a combination message c_m by combining the message m with the pair of electronic signatures r and s. The combining circuit 413 may transmit the combination message c_m to the receiver device 42.

The receiver device 42 may receive the combination message c_m and may determine whether the message m is generated by the transmitter device 41. The receiver device 42 may include a hash circuit 421 and a verification circuit 422. In some embodiments, the receiver device 42 may receive the public keys p, q, g, and y from another device (e.g., the third party device 35 of FIG. 6). In some embodiments, the receiver device 42 may receive the public keys p, q, g, and y from the transmitter device 41.

The message m included in the combination message c_m may be input to the hash circuit 421. The hash circuit 421 may generate the hash function h(m) for the message m based on the same hash algorithm as that of the hash circuit 411. The hash circuit 421 may transmit the hash function h(m) to the verification circuit 422.

The verification circuit 422 may obtain validity information that is a validation result of the pair of electronic signatures r and s based on the hash function h(m), the pair of electronic signatures r and s included in the combination message c_m, and the public keys p, q, g, and y of the transmitter device 41. In some embodiments, the verification circuit 422 may generate validity information indicating that the pair of electronic signatures r and s are valid when v is equal to r. Alternatively or additionally, the verification circuit 422 may generate validity information indicating that the pair of electronic signatures r and s are invalid when v is not equal to r in accordance with Algorithm 4.

The validity information may represent at least one of whether the pair of electronic signatures r and s are for the message m and whether the pair of electronic signatures r and s are generated based on the secret key of the transmitter device 31.

Referring to FIG. 7B, the electronic signature system 50 may include a transmitter device 61 and a receiver device 62. The transmitter device 61 may be the transmitter device 31 of FIG. 5 or the transmitter device 33 of FIG. 6 and the receiver device 62 may be the receiver device 32 of FIG. 5 or the receiver device 34 of FIG. 6. The transmitter device 61 may further include an encryption circuit 414, unlike the transmitter device 41 of FIG. 7A, and the receiver device 62 may further include a decryption circuit 423, unlike the receiver device 42 of FIG. 7A.

The encryption circuit 414 may receive the message m and may output an encryption message e_m for the message m to the combining circuit 413. In some embodiments, the encryption circuit 414 may generate the encryption message e_m in accordance with a symmetric encryption algorithm. For example, the symmetric encryption algorithm may include a data encryption standard (DES), an advanced encryption standard (AES), SEED, or ARIA. The combining circuit 413 may generate the combination message c_m by combining the encryption message e_m with the pair of electronic signatures r and s.

The decryption circuit 423 may receive the encryption message e_m and may output the message m to the hash circuit 421. In some embodiments, the decryption circuit 423 may generate the message m by decrypting the encryption message e_m in accordance with the symmetric encryption algorithm. For example, the decryption circuit 423 may perform decryption based on an encryption algorithm that is the same as that used by the encryption circuit 414.

Figure 8:
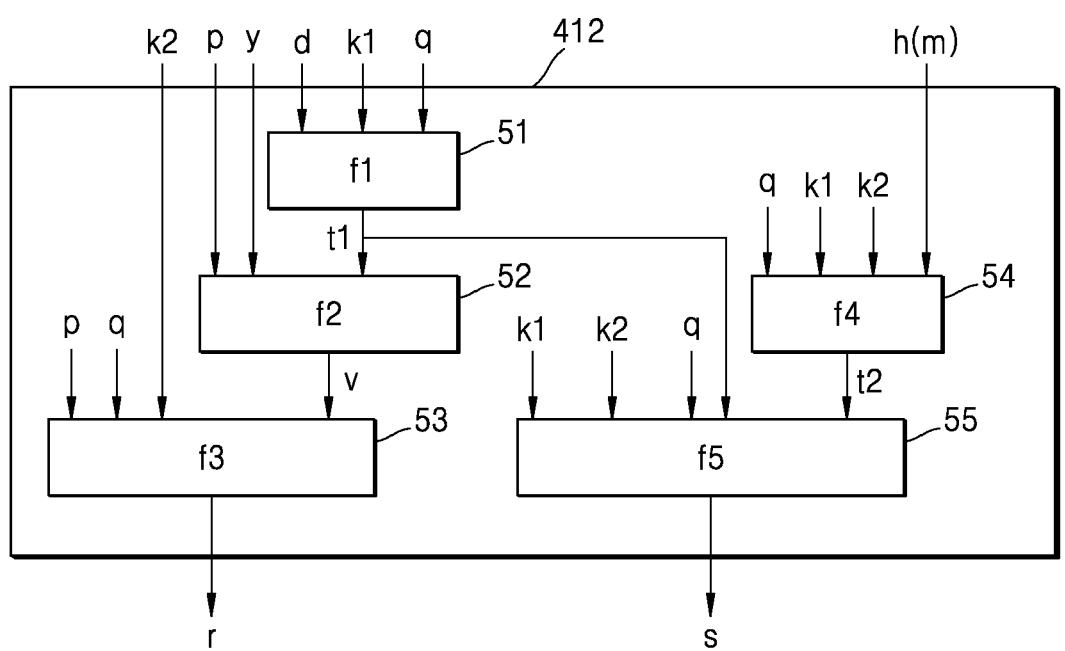
FIG. 8 is a block diagram illustrating a signature generating circuit according to an embodiment of the present disclosure.

FIG. 8 is a block diagram illustrating a signature generation circuit 412 according to an embodiment of the present disclosure.

Referring to FIG. 8, the signature generation circuit 412 may include first to fifth arithmetic circuits 51 to 55. The signature generation circuit 412 may generate the pair of electronic signatures r and s based on Algorithm 3.

The first arithmetic circuit 51 may generate a first parameter $t_1$ based on the secret key d, the first random number $k_1$, and the prime number q. For example, the first arithmetic circuit 51 may generate the first parameter $t_1$ by performing the multiplication operation on the secret key d and the first random number $k_1$, calculating the inverse of the result of the multiplication operation, and performing the modular operation based on the inverse of the result of the multiplication operation and the prime number q. The first arithmetic circuit 51, according to an embodiment of the present disclosure, may prevent an error injection attack from obtaining the secret key d by performing the multiplication operation on the secret key d and the first random number $k_1$.

The second arithmetic circuit 52 may generate the intermediate parameter v based on the prime number p, the public key y, and the first parameter $t_1$. For example, the second arithmetic circuit 52 may generate the intermediate parameter v by performing the exponentiation operation based on the public key y and the first parameter $t_1$ and performing the modular operation based on the result of the exponentiation operation and the prime number p.

The third arithmetic circuit 53 may generate the first electronic signature r based on the prime numbers p and q, the second random number $k_2$, and the intermediate parameter v. For example, the third arithmetic circuit 53 may generate the first electronic signature r by performing the exponentiation operation based on the intermediate parameter v and the second random number $k_2$ and performing the modular operation based on the result of the exponentiation operation and the prime numbers p and q.

The fourth arithmetic circuit 54 may generate a second parameter $t_2$ based on the prime number q, the first random number $k_1$, the second random number $k_2$, and the hash function h(m). For example, the fourth arithmetic circuit 54 may generate the second parameter $t_2$ by calculating the inverse $k_2^{-1}$ of the second random number $k_2$, performing a multiplication operation based on the first random number $k_1$ and the inverse $k_2^{-1}$ of the second random number $k_2$, and performing a modular operation based on a result of the multiplication operation and the prime number q.

The fifth arithmetic circuit 55 may generate the second electronic signature s based on the first random number $k_1$, the second random number $k_2$, the first parameter $t_1$, and the second parameter $t_2$. For example, the fifth arithmetic circuit 55 may generate the second electronic signature s by performing a first multiplication operation based on the first parameter $t_1$ and the second random number $k_2$, generating an inverse of a result of the first multiplication operation, performing a second multiplication operation based on the inverse of the result of the first multiplication operation and the first electronic signature r, performing a modular operation based on a result of the second multiplication operation and the prime number q, and performing an addition operation based on a result of the modular operation and the second parameter $t_2$.

Figure 9:
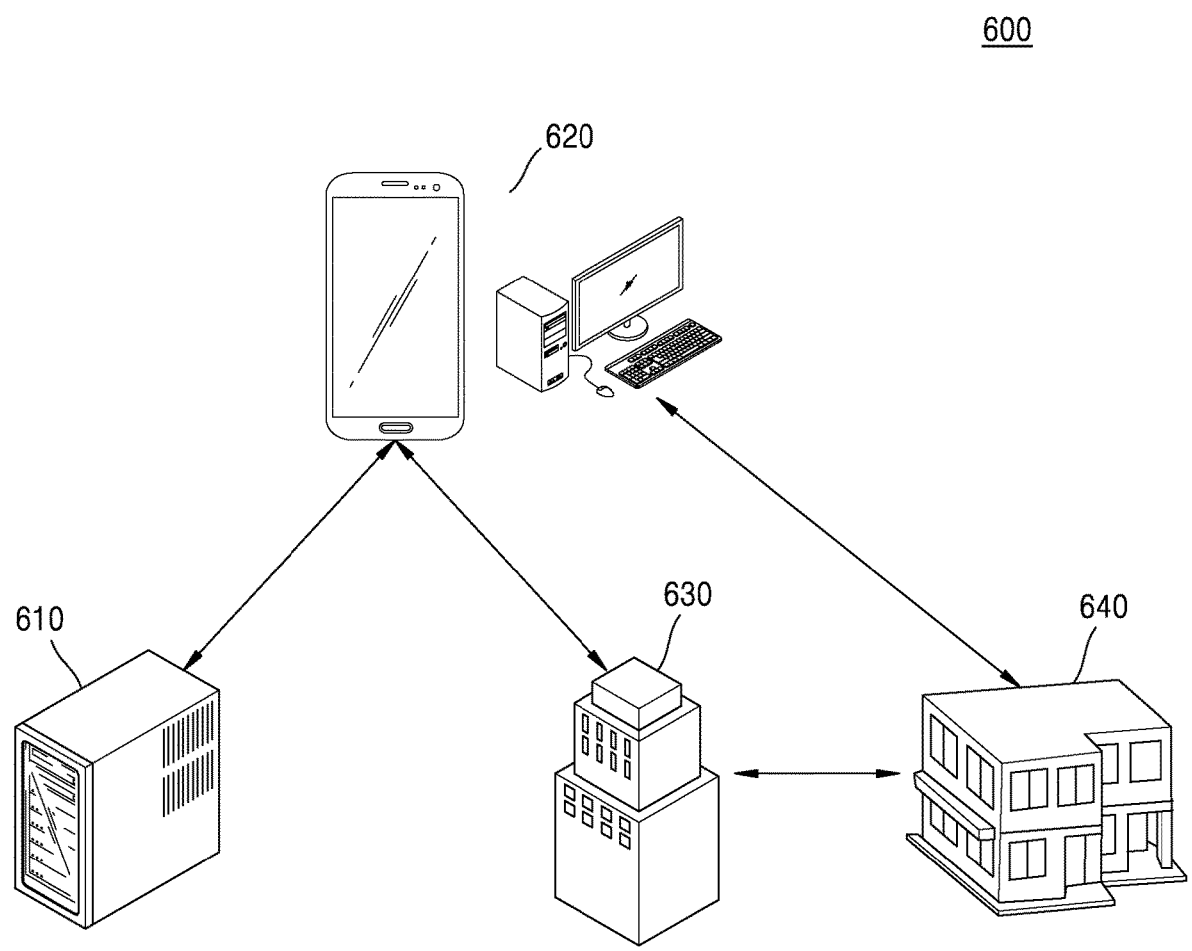
FIG. 9 is a view illustrating an electronic signature service system according to an embodiment of the present disclosure.

FIG. 9 is a view illustrating an electronic signature service system 600 according to an embodiment of the present disclosure.

Referring to FIG. 9, the electronic signature service system 600 according to an embodiment may include a user terminal 620, an electronic signature service server 610 storing data for generating an electronic signature of a user and providing an electronic signature service to the user, an electronic signature utilization server 630 using the electronic signature, and an authentication server 640 authenticating the electronic signature.

The electronic signature utilization server 630 is operated by an institution using the electronic signature. The electronic signature utilization server 630 may include a bank server, a server operated by a public institution, or a server providing an e-commerce service. However, the present disclosure is not limited thereto. The electronic signature utilization server 630 may issue an electronic document that requires authentication of the user, that is, a document to be signed. The electronic signature utilization server 630 may transmit data to be signed derived from the document to be signed to the user terminal 620. The data to be signed may include original data of the document to be signed and data processed to be suitable for encrypting the original data of the document to be signed. The electronic signature utilization server 630 may request the user terminal 620 for an electronic signature for the data to be signed.

The authentication server 640 is operated by an accredited certification authority issuing and managing a certificate for validating the electronic signature. The accredited certification authority may include financial settlement agents, such as, but not limited to, Korea Information Certification, Korea Securities Computer, Korean Electronic Certification, Korea Computer Resources, or Korean Trade Information Communications.

The user terminal 620 refers to a device used by the user with the authority of the electronic signature. The user terminal may include a smartphone, a tablet PC, or a laptop computer. However, the present disclosure is not limited thereto. The user terminal 620 may include the electronic signature service server 610 and a communication means capable of communicating with the electronic signature service server 610. The user terminal 620 may receive the data to be signed and a request to the electronic signature for the data to be signed from the electronic signature utilization server 630.

The user terminal 620 may include an encryption device (e.g., encryption device 100 of FIG. 1) according to an embodiment of the present disclosure. That is, the user terminal 620 may prevent an error injection attack from obtaining a random number by generating an electronic signature using a plurality of random numbers. Alternatively or additionally, the user terminal 620 may prevent an power analysis attack from obtaining a secret key by generating an electronic signature based on a multiplication operation on the random number and the secret key.

The user terminal 620 may request the electronic signature service server 610 to generate an electronic signature without directly generating the electronic signature. If necessary, the user terminal 620 may process the data to be signed to a format for an easy electronic signature and may transmit a request for an electronic signature for the data to be signed to the electronic signature service server 610. At this time, the electronic signature service server 610 may also include an encryption device (e.g., encryption device 100 of FIG. 1) according to an embodiment of the present disclosure.

When the user terminal 620 receives the electronic signature from the electronic signature service server 610, the user terminal 620 may generate an electronic signature statement using the electronic signature. The electronic signature statement may be created in a format that may be validated by the electronic signature utilization server 630 or the authentication server 640. The user terminal 620 may transmit the generated electronic signature statement to the electronic signature utilization server 630.

Figure 10:
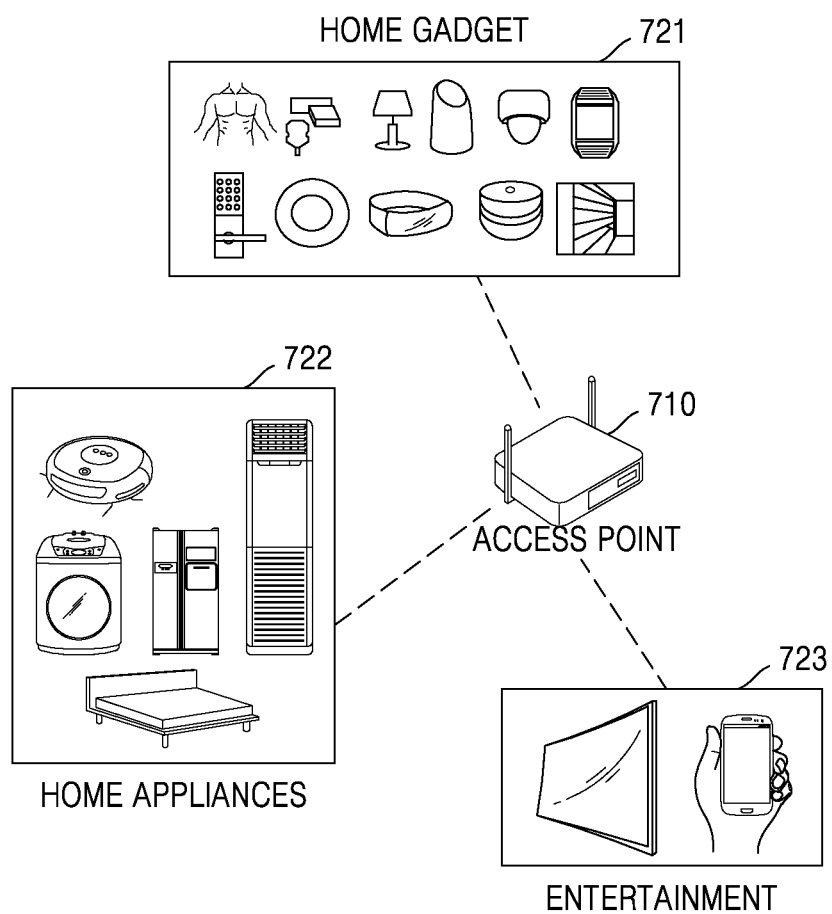
FIG. 10 illustrates examples of a communication device performing security validation through an electronic signature generated according to an embodiment of the present disclosure.

FIG. 10 illustrates examples of a communication device performing security validation through an electronic signature generated according to an embodiment of the present disclosure. For example, FIG. 10 illustrates an example in which various wireless communication devices communicate with one another in a wireless communication system using a wireless local area network (WLAN).

A home gadget 721, a home appliance 722, an entertainment device 723, and an access point (AP) 710 may configure an Internet of things (IoT) network system. Each of the home gadget 721, the home appliance 722, the entertainment device 723, and the AP 710 may include an encryption device (e.g., encryption device 100 of FIG. 1) according to an embodiment of the present disclosure and may generate an electronic signature based on a multiplication operation on a random number and a secret key and a plurality of random numbers. Security among the AP 710, the home gadget 721, the home appliance 722, and the entertainment device 723 configuring the IoT network system may be enhanced through the generated electronic signatures. The home gadget 721, the home appliance 722, and the entertainment device 723 may wirelessly communicate with the AP 710 or with one another.

While the present disclosure has been particularly shown and described with reference to embodiments thereof, it will be understood that various changes in form and details may be made therein without departing from the spirit and scope of the following claims.

What is claimed is:

1. A method of generating a signature of a message by a first device based on a secret key and a public key, the method comprising:
generating a first parameter based on a first multiplication operation on the secret key and a first random number;
generating, using a signature generation circuit, a first electronic signature based on the first parameter and the public key;
generating a second parameter by performing a second multiplication operation of a hash function of the message, the first random number, and an inverse of a second random number, and performing a first modular operation based on a result of the second multiplication operation and a prime number;
generating, using the signature generation circuit, a second electronic signature by performing a third multiplication operation of the first parameter and the second random number, performing a fourth multiplication operation of an inverse of a result of the third multiplication operation and the first electronic signature, performing a second modular operation based on a result of the fourth multiplication operation and the prime number, and performing an addition operation on a result of the second modular operation and the second parameter;
combining, using a combining circuit, the message, the first electronic signature, and the second electronic signature to generate a combination message; and
transmitting, to a second device over a channel, the combination message, causing the second device to obtain validity information, using a verification circuit, certifying the combination message that has been transmitted by the first device, the validity information being based on the message, the first electronic signature, and the second electronic signature.

2. The method of claim 1, wherein the generating of the first parameter comprises:
performing the first multiplication operation on the secret key and the first random number; and
generating a first inverse of a result of the first multiplication operation as the first parameter.

3. The method of claim 2, wherein the generating of the first electronic signature comprises:
generating an intermediate parameter by performing a first exponentiation operation on the public key based on the first parameter; and
generating the first electronic signature by performing a second exponentiation operation on the intermediate parameter based on the second random number.

4. The method of claim 3, wherein the generating of the second parameter comprises:
generating a hash value of the message; and
generating the second parameter by performing the second multiplication operation on the hash value, the first random number, and the inverse of the second random number.

5. The method of claim 4, wherein the generating of the hash value of the message comprises:
encrypting the message using a symmetric encryption algorithm or an asymmetric encryption algorithm; and
generating the hash value of the encrypted message.

6. The method of claim 1, wherein the transmitting of the combination message comprises:
generating transmission data, using the combining circuit, by combining the message, the first electronic signature, and the second electronic signature with one another; and outputting the transmission data to the channel.

7. A message authentication method of a system including a first device and a second device exchanging a message, the message authentication method comprising:
generating, by the first device, a first parameter based on a first inverse of a first multiplication operation on a first secret key of the first device and a first random number;
generating, using a signature generation circuit of the first device, a first electronic signature based on the first parameter, a second random number and a first public key of the first device;
generating, by the first device, a second parameter by performing a second multiplication operation of a hash function of the message, the first random number, and an inverse of the second random number, and performing a first modular operation based on a result of the second multiplication operation and a prime number;
generating, using the signature generation circuit of the first device, a second electronic signature by performing a third multiplication operation of the first parameter and the second random number, performing a fourth multiplication operation of an inverse of a result of the third multiplication operation and the first electronic signature, performing a second modular operation based on a result of the fourth multiplication operation and the prime number, and performing an addition operation on a result of the second modular operation and the second parameter;
combining, using a combining circuit of the first device, the message, the first public key, the first electronic signature, and the second electronic signature to generate a combination message;
transmitting, by the first device to the second device over a channel, the combination message; and
obtaining, using a verification circuit of the second device, validity information certifying the combination message that has been transmitted by the first device, the validity information being determined based on the message, the first public key, the first electronic signature, and the second electronic signature.

8. The message authentication method of claim 7, further comprising validating, by the second device, the first electronic signature and the second electronic signature based on the first public key.

9. The message authentication method of claim 7, further comprising:
providing, by the first device to a third device of the system, the first public key;
generating and transmitting to the first device, by the third device, a certificate for the first public key based on a second secret key of the third device;
outputting, by the first device to the second device, the certificate;
requesting, by the second device to the third device, to validate the certificate; and
providing, by the third device to the second device, validity of the certificate.

10. The message authentication method of claim 7, wherein the generating of the first parameter based on the first inverse of the first multiplication operation on the first secret key of the first device and the first random number comprises:
performing the first multiplication operation on the first secret key and the first random number;

calculating the first inverse of a result of the first multiplication operation; and generating the first parameter by performing a third modular operation based on the first inverse and a first prime number.

11. The message authentication method of claim 10, wherein the generating of the first electronic signature comprises:

performing a first exponentiation operation based on the first public key and the first parameter;

generating an intermediate parameter by performing a fourth modular operation on a result of the first exponentiation operation and a second prime number;

performing a second exponentiation operation on the intermediate parameter and the second random number; and generating the first electronic signature by performing a fifth modular operation on a result of the second exponentiation operation, the first prime number, and the second prime number.

12. An encryption device for generating a digital signature of a message, the encryption device comprising:

an electronic signature generating circuit configured to:

obtain, from a random number generator of the encryption device, a first random number and a second random number, generate a first parameter based on a first multiplication operation on a secret key and the first random number, generate a second parameter by performing a second multiplication operation of a hash value of the message, the first random number, and an inverse of the second random number, and performing a first modular operation based on a result of the second multiplication operation and a prime number, generate, using a signature generation circuit, a pair of electronic signatures of the message by performing at least one multiplication operation of the second random number and a public key for the secret key, performing a second modular operation based on a result of the at least one multiplication operation and the prime number, and performing an addition operation on a result of the second modular operation and the second parameter, combine, using a combining circuit, the message and the pair of electronic signatures to generate a combination message, output the combination message, and generate, using a verification circuit, validity information certifying the combination message that has been outputted by the encryption device, the validity information being based on the message and the pair of electronic signatures; and a memory configured to store the pair of electronic signatures.

13. The encryption device of claim 12, wherein the electronic signature generating circuit comprises:

a hash circuit configured to generate the hash value of the message.

14. The encryption device of claim 13, wherein the electronic signature generating circuit further comprises an encryption circuit configured to generate a cipher text by encrypting the message, and wherein the hash circuit is further configured to generate the hash value based on the cipher text.

15. The encryption device of claim 12, wherein to generate the first parameter, the electronic signature generating circuit is further configured to:

calculate a first inverse of a result of the first multiplication operation, and perform a third modular operation based on the first inverse and a first prime number.

16. The encryption device of claim 15, wherein the electronic signature generating circuit is further configured to:

generate an intermediate parameter by performing a first exponentiation operation based on the public key and the first parameter and by performing a fourth modular operation based on a result of the first exponentiation operation and a second prime number, and generate a first electronic signature included in the pair of electronic signatures by performing a second exponentiation operation based on the intermediate parameter and the second random number and performing a fifth modular operation based on a result of the second exponentiation operation, the first prime number, and the second prime number.

17. The encryption device of claim 16, wherein to generate the second parameter, the electronic signature generating circuit is configured to:

perform the second multiplication operation based on the hash value, the first random number, and a second inverse of the second random number, and perform a sixth modular operation based on a result of the second multiplication operation and the first prime number.

18. The encryption device of claim 17, wherein the electronic signature generating circuit is further configured to generate a second electronic signature included in the pair of electronic signatures, wherein to generate the second electronic signature, the electronic signature generating circuit is configured to:

perform a third multiplication operation on the first parameter and the second random number, calculate a third inverse of a result of the third multiplication operation, perform a fourth multiplication operation on the third inverse and the first electronic signature, perform a seventh modular operation based on a result of the fourth multiplication operation and the first prime number, and perform the addition operation on a result of the seventh modular operation and the second parameter.

* * * * *